United States Patent
Schröder et al.

(10) Patent No.: US 6,517,920 B1
(45) Date of Patent: Feb. 11, 2003

(54) MULTILAYER, COEXTRUDED, BIAXIALLY STRETCHED HIGH-BARRIER PLASTIC CASING

(75) Inventors: Nils Schröder, Fallingbostel (DE); Detlef Wolf, Fallingbostel (DE)

(73) Assignee: Wolff Walsrode AG, Walsrode (DE)

( * ) Notice: Subject to any disclaimer, the term of this patent is extended or adjusted under 35 U.S.C. 154(b) by 131 days.

(21) Appl. No.: 09/659,465

(22) Filed: Sep. 11, 2000

(30) Foreign Application Priority Data

Sep. 14, 1999 (DE) .......................................... 199 43 909

(51) Int. Cl.[7] .......................... A22C 13/00; B32B 27/32; B32B 27/34
(52) U.S. Cl. ...................... 428/36.7; 426/105; 426/129; 426/135; 426/278; 428/475.8; 428/476.1
(58) Field of Search ............................ 428/36.7, 475.8, 428/476.1; 426/105, 129, 135, 278

(56) References Cited

U.S. PATENT DOCUMENTS

| | | | |
|---|---|---|---|
| 4,525,414 A | 6/1985 | Ohya et al. ................. | 428/213 |
| 5,425,974 A | 6/1995 | von Widdern et al. ....... | 428/354 |
| 5,480,691 A | 1/1996 | Hammer et al. ........... | 428/34.8 |
| 5,612,104 A | 3/1997 | Grund ........................ | 428/348 |
| 5,747,124 A | 5/1998 | Pophusen et al. .......... | 428/34.8 |
| 5,863,643 A | 1/1999 | von Widdern et al. ...... | 428/220 |
| 5,985,386 A | 11/1999 | von Widdern et al. ..... | 428/34.8 |

FOREIGN PATENT DOCUMENTS

| | | |
|---|---|---|
| CA | 2231627 | 11/1998 |
| EP | 0 530 549 | 6/1999 |

*Primary Examiner*—Sandra M. Nolan
(74) *Attorney, Agent, or Firm*—Joseph C. Gil; James R. Franks; Godfried R. Akorli

(57) ABSTRACT

A multilayered, coextruded tubular biaxially stretched casing, having oxygen and water vapor barrier properties plus reduced adhesion to contents, e.g., foodstuffs, contained within the casing, is disclosed. The tubular casing has five layers in the order of A|B|C|D|E. Outer layer A, contains as its principal component at least one polyamide. Layer B has oxygen barrier properties, and may be composed of a substantially hydrolyzed copolymer of ethylene and vinyl acetate. The core layer C contains as its principal component at least one polyamide. Layer D contains a modified polyolefin. Inner layer E (i.e., the layer that is in contact with the contents of the tubular casing) is a water vapor barrier layer, that contains as its principal component at least one member selected from the group consisting of homopolyolefin and copolyolefin. The tubular casing is useful for encasing foodstuffs, such as pasty or liquid foodstuffs.

19 Claims, No Drawings

MULTILAYER, COEXTRUDED, BIAXIALLY STRETCHED HIGH-BARRIER PLASTIC CASING

CROSS REFERENCE TO RELATED PATENT APPLICATION

The present patent application claims the right of priority under 35 U.S.C. §119 (a)–(d) of German Patent Application No. 199 43 909.5, filed Sep. 14, 1999.

FIELD OF THE INVENTION

This invention relates to tubular, seamless, at least five-layer, biaxially stretched, shrinkable casing for wrapping pasty or liquid products, in particular foodstuffs, in a durable and wrinkle-free manner, which casing is characterised by extraordinarily high water vapour and oxygen barrier properties and exhibits low adhesion to the contents.

BACKGROUND OF THE INVENTION

Seamless plastic casings are frequently used for wrapping pasty or liquid products for manufacturing or packaging purposes. Typical applications are the use of such casings for the production and/or packaging of boiled and boiling sausages, processed cheese, soups or pastes having a high fat content. Depending upon the product to be produced or packaged, however, wide-ranging and specific requirements must be met in order to comply with practical requirements.

In relation to sausage production, these requirements may, for example, include:

- good barrier properties
- heat resistance up to sterilisation temperature
- good adhesion to the contents
- elevated shrinkage
- elevated strength, dimensional stability, tautness
- good peeling behaviour, easy peelability, good slicing behaviour
- good conversion properties, in particular gatherability
- good colouring properties
- good printability and reliable printing ink adhesion
- compliance with foodstuffs legislation (EC Directives, Bundesamt für gesundheitlichen Verbraucherschutz und Veterinärmedizin [German Federal Office for Consumer Health Protection and Veterinary Medicine] (BGVV), Food & Drug Administration (FDA))
- environmental compatibility of the materials used.

Hitherto known, commercially available multilayer, biaxially stretched, seamless casings are specifically tailored for the production and/or packaging of meat products, in particular sausage, and, to a greater or lesser extent, meet the above-stated requirements. There are, however, certain applications in which in particular the barrier properties of commercially available casings are inadequate and where moreover elevated adhesion of the casing to the contents is not necessary or is even disadvantageous. Such applications include, for example, the production of animal food having a desired storage life without refrigeration of several months or the packaging of contents which react particularly sensitively to loss of moisture and have a tendency to dry out, such as marzipan. If contents of the stated type are packaged in conventional commercial multilayer, biaxially stretched, seamless plastic casings and stored for an extended period, the contents undergo a distinct loss in weight, which is usually accompanied by creasing of the casing, over a period of a few weeks to months due to permeation of water vapour originating from the contents outwards through the casing as a result of inadequate water vapour barrier properties of the casing, and/or oxidation processes occur on the surface of the contents, which may impair visual and/or sensory properties, due to permeation of atmospheric oxygen inwards through the casing as a result of inadequate oxygen barrier properties. Any obvious discrepancy between the weight of the contents and the weight printed by the manufacturer, creased appearance of the casing and/or surface discolouration of the contents give the consumer an impression that the product is old and stale, so that it is rejected by the consumer.

Another disadvantage of commercially available plastic casings for use as a casing for animal food is the elevated adhesion which such casings develop towards contents containing protein, such as for example meat products. While for sausage products for human consumption adhesion must be sufficiently high in order to avoid the formation of a coating of jelly which is considered unappetising, consumers desire low adhesion for casings for animal food, for example dog sausage, so that, once the casing has been cut, the contents slide out easily and, if possible, without any necessity to touch the contents, which is considered unpleasant.

A casing suitable for the stated applications is accordingly characterised by the following core properties which are in addition to or at variance with the range of requirements for sausage casings described above:

extraordinarily good barrier properties towards oxygen (oxygen permeability <5 ml/m$^2$·d·bar at 23° C. and 75% relative humidity to avoid oxidation processes) and water vapour (water vapour permeability <2 g/m$^2$·d at 23° C. and 85% relative humidity to avoid weight loss on extended storage without refrigeration), low adhesion to the contents.

European application EP-A-0 107 854 describes a tubular, five-layer laminate consisting of an inner layer of thermoplastic resin, a middle layer of vinylidene chloride copolymer (PVDC), an outer layer of olefin resin and two adhesive layers between the main layers. Having an oxygen permeability of 50 ml/m$^2$·d·atm (30° C., 100% relative humidity) and a water vapour permeability of 5 g/m$^2$·d (40° C., 95% relative humidity), the casing exhibits inadequate barrier properties towards oxygen and water vapour and moreover contains PVDC, which contains halogen, as the water vapour barrier component, use of which is environmentally questionable and is thus now increasingly unacceptable.

DE-A-40 01 612 discloses a tubular, three-layer coextruded, biaxially stretched casing having an inner and outer layer of polyamide or a polymer blend containing polyamide and a middle oxygen barrier layer of aromatic polyamide or copolyamide. While this composite does indeed provide elevated oxygen barrier properties, it provides only a low to moderate water vapour barrier which is not adequate for several months' storage without refrigeration. Moreover, due to the polyamide-based inner layer, the inside of the casing adheres undesirably strongly to contents containing fat and protein.

DE-A-41 28 081 describes a multilayer, biaxially stretched tubular film which comprises as core layer at least one oxygen barrier ply of ethylene/vinyl alcohol copolymer (EVOH), aromatic or aliphatic (co)polyamide and, as inner layer, at least one water vapour barrier ply of aliphatic (co)polyamide. This casing meets the requirements for good water vapour barrier properties. However, during storage, moisture passes from the contents into the core layer, which acts as the oxygen barrier layer. Since the moisture accumulates in the core layer and cannot be released through the outer polyolefin layer, which acts as the water vapour barrier layer, oxygen barrier properties become ever poorer during storage. This casing is accordingly unsuitable for extended periods of storage, in particular for storage without refrigeration. An outer polyolefin layer furthermore has the disadvantage that, before being printed, the film must be subjected to an additional step, for example corona discharge, in order to ensure sufficient adhesion of the printing inks.

DE-A 41 28 082 describes an at least three-layer, biaxially stretched tubular film, which comprises an outer layer of aliphatic polyamide, an oxygen barrier core layer of EVOH, aromatic and/or aliphatic (co)polyamide and an inner polyolefinic water vapour barrier layer, preferably an ionomer polymer, which exhibits adhesion to the contents. The disadvantage of this casing is the adhesion of the inner layer to the contents and the elevated water vapour permeability of ionomer polymers in comparison with other polyolefins.

EP-A-0 530 538 describes a tubular, five-layer coextruded, biaxially stretched casing, which consists of an outer layer of polyamide, a secondary outer layer of coupling polyolefin or EVOH, which optionally has oxygen barrier properties, a middle layer of polyamide, a secondary inner layer of coupling polyolefin which has water vapour barrier properties and an inner layer of polyamide. Although this casing has proven water vapour barrier properties, weight losses of the test contents of at least 0.3 wt. % were observed after 20 days' storage in a cold store. While a barrier value corresponding to this weight loss for sausage products packaged in the stated casing is entirely adequate for cold storage for a period limited to a few weeks, when converted to storage conditions at room temperature over a period of a few months, these data would lead one to expect a weight loss which fails to meet the stated requirements by a clear margin. Moreover, due to the polyamide-based inner layer, this casing may be expected to exhibit undesirably strong adhesion of the inside of the casing to contents containing fat and protein.

DE-A-43 39 337 describes a five-layer tubular film for packaging and wrapping pasty foodstuffs. This tubular film, in particular sausage casing, based on polyamide is characterised in that it is produced from an internal and an external layer of the same polyamide material consisting of at least one aliphatic polyamide and/or at least one aliphatic copolyamide and/or at least one partially aromatic polyamide and/or at least one partially aromatic copolyamide, a middle polyolefin layer and two coupling agent layers consisting of the same material. The content of partially aromatic polyamide and/or copolyamide is 5 to 60%, in particular 10 to 50%, relative to the total weight of the polymer blend of partially aromatic and aliphatic polyamides and copolyamides. The disadvantage of this casing is the inadequacy of its oxygen barrier properties, which gives rise to colour change (greying) of contents susceptible to oxidation. In addition, due to the polyamide-based inner layer, the inner side of the casing adheres undesirably strongly to contents containing fat and protein in this case too.

EP-A-0 879 560 discloses an at least four-layer, biaxially stretched foodstuff casing having two oxygen barrier layers. The oxygen barrier properties are substantially provided in this case by a non-external layer containing EVOH and an external layer containing polyamide with an aromatic content. This composite does not, however, exhibit adequate water vapour barrier properties for extended storage without refrigeration.

The described prior art film composites exhibit deficiencies in individual aspects with regard to the range of requirements described above. In particular, commercially known casings exhibit deficiencies in respect of the essential features of barrier properties either towards water vapour or towards oxygen. It has not hitherto been possible to achieve a combination of these barrier properties with regard to the stated requirements for extended storage in conjunction with a slight tendency of the inner layer to adhere to the contents and this combination is not met by any commercially available product.

SUMMARY OF THE INVENTION

The object thus arose of providing a foodstuff casing which meets the stated range of requirements with regard to excellent water vapour and oxygen barrier properties and the inner side of which exhibits only slight adhesion to contents containing fats and protein.

The present invention achieves this object by the provision of a multilayer, coextruded, tubular, biaxially stretched casing consisting of an outer layer A, which contains a polyamide or a mixture of two or more polyamides as the principal component, a secondary outer layer B, which exhibits oxygen barrier properties, a middle layer C, which contains a polyamide or a mixture of two or more polyamides as the principal component, an inner water vapour barrier layer E which develops slight adhesion to the contents and contains a polypropylene homo or copolymer or a mixture of these as the principal component, together with a secondary inner layer D which exhibits a coupling action towards layers C and E and contains at least one modified polyolefin.

DETAILED DESCRIPTION OF THE INVENTION

The specific properties of the casing according to the invention arise, on the one band, from the specific layer structure, which is characterised by the sequence of layers, proceeding from the outside inwards, A/B/C/D/E.

The outer layer A, which may be printed without being pretreated, consists as the principal component either of an aliphatic homopolyamide or an aliphatic copolyamide or a blend of aliphatic homo- and copolyamide or a blend of aliphatic homo- or copolyamide and a partially aromatic polyamide. Suitable aliphatic homo- and copolyamides are those polyamides as are described in general terms in Kunststoffhandbuch, part 3/4, Polyamide, pages 22 et seq., Carl Hanser Verlag, Munich, Vienna, 1998. The aliphatic polyamide is a homopolyamide prepared from aliphatic primary diamines and aliphatic dicarboxylic acids or a homopolymer of ω-aminocarboxylic acids or the lactams thereof. The aliphatic copolyamide contains the same units and is, for example, a polymer based on one or more aliphatic diamines and one or more dicarboxylic acids and/or one or various ω-aminocarboxylic acids or the lactams thereof. The aliphatic primary diamines in particular contain 4 to 8 C atoms. Suitable diamines are tetra-, penta-, hexa- and octamethylenediamine, with hexamethylenediamine being particularly preferred. The aliphatic dicarboxylic acids in particular contain 4 to 12 C atoms. Examples of suitable dicarboxylic acids are adipic acid, azelaic acid, sebacic acid and dodecanedicarboxylic acid. The ω-aminocarboxylic acid or the lactams thereof contain 6 to 12 C atoms. One example of ω-aminocarboxylic acids is 11-aminoundecanoic acid. Examples of lactams are ε-caprolactam and ω-laurolactam. Particularly preferred aliphatic polyamides are polycaprolactam (PA 6) and polyhexamethyleneadipamide (PA 66). One particularly preferred aliphatic copolyamide is PA 6/66, which consists of caprolactam, hexamethylenediamine and adipic acid units. Partially aromatic polyamides are described in Kunststoffhandbuch, part 3/4, Polyamide, pages 803 et seq., Carl Hanser Verlag, Munich, Vienna, 1998.

In the partially aromatic polyamides and copolyamides, it is possible either for the diamine units predominantly or exclusively to form the aromatic units, while the dicarboxylic acid units are predominantly or exclusively of an aliphatic nature, or for the diamine units to be predominantly or exclusively of an aliphatic nature, while the dicarboxylic acid units predominantly or exclusively form the aromatic units. Examples of the first embodiment are partially aromatic polyamides or copolyamides, in which the aromatic diamine units consist of m-xylylenediamine and phenylenediamine. The aliphatic dicarboxylic acid units of this embodiment usually contain 4 to 10 C atoms, such as for example adipic acid, sebacic acid and azelaic acid.

Apart from the aromatic diamine units and the aliphatic dicarboxylic acid units, aliphatic diamine units and aromatic dicarboxylic acid units may additionally be present each in quantities of up to 5 mol %. One particularly preferred embodiment consists of m-xylylenediamine and adipic acid units. This polyamide (PA-MXD6) is, for example, sold by Mitsubishi Gas Chemical Co. Inc. under the name MX-Nylon. Examples of this second embodiment are partially aromatic polyamides and copolyamides in which the aliphatic diamines usually contain 4 to 8 C atoms. Among the aromatic dicarboxylic acids, particular emphasis should be placed upon isophthalic acid and terephthalic acid. Apart from the aliphatic diamine units and the aromatic dicarboxylic acid units, aromatic diamine units and aliphatic dicarboxylic acid units may additionally be present each in quantities of up to 5 mol %.

One particularly preferred embodiment consists of units of hexamethylenediamine, isophthalic acid and terephthalic acid. This polyamide (PA 6I/6T) is, for example, sold by DuPont de Nemours under the name Selar PA. The partially aromatic polyamide PA 6I/6T is preferably added in quantities of between 2 and 40 wt. % per layer, in particular between 5 and 20 wt. %. The partially aromatic polyamide PA-MXD6 is preferably added in quantities of between 5 and 40 wt. % per layer, in particular between 10 and 30 wt. %. Apart from the polyamide content, layer A may contain processing auxiliaries, inorganic fillers, light stabilising pigments, colouring pigments and/or dyes.

The secondary outer layer B, which imparts effective oxygen barrier properties to the overall composite, consists of a substantially hydrolysed ethylene/vinyl acetate copolymer (EVOH) having an ethylene content of 25 to 53 wt. %, preferably of 29 to 38 wt. %. In a preferred embodiment, layer thickness is between 2 and 8 $\mu$m, in particular between 3 and 6 $\mu$m.

The middle layer C, which makes an essential contribution to stability and consistency of gauge, consists of the polymers and additives mentioned in the description of layer A, but is optionally of a different composition from layer A.

The secondary inner coupling layer D, positioned between layer C and inner layer E preferably contains a modified polyolefin. Modified polyolefin in the present context is a homo- or copolymer of ethylene or propylene optionally copolymerized with at least one linear $\alpha$-olefin having 3 to 8 C atoms, which is grafted with or further copolymerized with at least one monomer selected from the group consisting of $\alpha,\beta$-unsaturated dicarboxylic acids (such as for example maleic acid, fumaric acid, itaconic acid), their anhydrides, esters, amides and imides. Further suitable copolymers are ionomeric copolymers of ethylene and propylene and optionally of further linear $\alpha$-olefins containing 3 to 8 C atoms with $\alpha,\beta$-unsaturated carboxylic acids and/or the metal salts thereof and/or the alkyl esters thereof, or graft polymers of the stated monomers onto polymers, or partially saponified ethylene/vinyl ester copolymers which are optionally graft polymerised with a monomer of the stated acids. In a preferred embodiment, the layer thicknesses of the coupling agent layers are between 1 and 6 $\mu$m.

The principal component of the inner layer E, which imparts effective water vapour barrier properties to the overall composite and adheres only slightly to polar substances, consists of a polyolefin homo- or copolymer or of a blend of these with a melting point of the lowest-melting component of at least 136° C., preferably of at least 147° C. The layer may furthermore also contain other substances, preferably colouring pigments. The preferred layer thickness of layer E is less than 10 $\mu$m.

Additives may be added to the inner layer and/or to the outer layer in order to improve processing behaviour and opening behaviour. Antiblocking and lubricant additives have in particular proved suitable in this connection. These antiblocking additives are based, for example, on silicon oxide.

UV light absorbers may be added to individual layers in order to reduce the action of light on the contents. Inorganic pigments, in particular zinc, titanium, iron and silicon oxides, have proved effective to this end. In a particularly preferred embodiment, the ultrafine inorganic pigment is incorporated into the film composite by means of a masterbatch, the carrier material of which is compatible with the base material of the layer. The quantity of the pigment is from 0.1 to 5 wt. %, preferably from 0.5 to 2.5 wt. %, relative to the total weight of the casing.

The specific properties of the casing according to the invention arise not only from the layer structure and the raw materials used, but also from the production process, which is divided into the following process steps:

1. coextrusion, gauging and cooling of the tube which is to be stretched
2. reheating of the tube to a suitable stretching temperature
3. biaxial stretching by applying a pressure differential between the interior of the tube and the surroundings of the tube and by a longitudinal take-off force which supports longitudinal stretching,
4. heat setting of the biaxially stretched tubular film
5. winding and subsequent offline conversion steps (gathering etc.).

The casing according to the invention is preferably produced using the "double bubble" process, in which the coextrudate, which has been extruded in tubular form through a circular ring-shaped die, is initially converted into the solid state by intensive cooling and, as the production process proceeds, the resultant thick-walled primary tube (300 to 600 $\mu$m) is then reheated in one or more stages by a suitable energy input method to a temperature suitable for solid stretching in order subsequently to be stretched in both transverse and longitudinal direction between two tightly sealed roller pairs by trapping a pressure bubble filled with gas or liquid. While the ratio of the differing circumferential speeds of the rollers delimiting the bubble corresponds to the longitudinal degree of stretching, the transverse degree of stretching is calculated from the ratio of tube diameter in the stretched state to that of the unstretched primary tube. The stretching ratio (RV) is the quotient of the transverse degree of stretching and the longitudinal degree of stretching; the degree of stretching per unit area (FR) is determined from the product of the longitudinal degree of stretching and the transverse degree of stretching and is at least 4, preferably greater than 6, particularly preferably being at least 8. During biaxial stretching, the molecules of the tube, which is in the solid state, are aligned in such a manner that the modulus of elasticity and strength values in both transverse and longitudinal directions are considerably increased. After the first stretching stage, the casing, which has again been inflated by a compressed air cushion between two pressure rollers, is permitted to undergo a defined level of recovery (reduction in diameter) in a second bubble and a longitudinal post-stretching step is optionally simultaneously performed. The diameter of the tube may be controlled by varying the compressed air pressure in the heat setting stage which is subsequently to be performed. The desired shrinkage values of the casing may be precisely established by means of heat setting by adjusting the parameters recovery (quotient of the difference between the stretching gauge and heat setting gauge relative to the heat setting gauge), heat setting temperature and residence time. Higher flexibility may be achieved by performing heat setting in the presence of water or steam. Before the biaxially stretched tubular film is wound, it should be cooled sufficiently in order to avoid activating the shrinkage tensions on the roll. The biaxially stretched tubular film is produced in a diameter range between 10 and 400 mm, preferably between 25 and 220 mm. The sum of the layer thicknesses of the coextruded tubular casing is 25 to 80 $\mu$m, preferably 35 to 65 $\mu$m.

The coextruded tubular casings conventionally exhibit free shrinkage in at least one direction of orientation of between 1 and 25%, in particular between 10 and 20%, measured at 100° C. after 15 minutes. At below 40° C., free shrinkage is below 3%, thus ensuring sufficient storage stability of the casings, which optionally have been heat set.

The relevant properties of the casings described below were determined as follows:

Water Vapour Permeability (WVP)

WVP is determined in accordance with DIN 53122, section 2 at a temperature of 23° C. and relative atmospheric humidity of 85%. The value states the quantity of water vapour in grams which, under the stated test conditions, passes through an area of 1 m$^2$ of the film to be tested over a period of 1 day (24 hours).

Oxygen Permeability (O2P)

O2P is determined in accordance with DIN 53380, part 3, at a temperature of 23° C. and relative atmospheric humidity of 75%. The value states the volume of oxygen in milliliters which, under the stated test conditions, passes through an area of 1 m$^2$ of the film to be tested over a period of 1 day (24 hours) at an oxygen partial pressure of 1 bar.

Storage Test at 23° C. for 90 Days

The casings to be tested are tautly filled using a conventional commercial filling machine with test contents sensitive to oxidation (test mix of boiled sausage type), sealed at both ends with a clip and then sealed with wax around the clip closures. Once the resultant sausages have been weighed, they are stored at room temperature in a storeroom. After 90 days, the sausages are reweighed, wherein the percentage weight loss is determined from the ratio of the weight difference before and after storage to the weight before storage. Optical appearance (i.e. greying) of the surface of the test contents and the degree of creasing of the casing after storage is subjectively evaluated by experts using a rating scheme, wherein a sample freshly filled with boiled sausage is used as a comparison (optical appearance of mix: no greying, i.e. rating 1, degree of creasing of casing: taut, no creases, i.e. rating 1).

Adhesion of Contents to Inner Side of Casing

Assessment was made on samples filled with test contents (test mix of boiled sausage type) by independent subjective evaluation by experts.

The invention also provides the use of the casing according to the invention as a foodstuff casing, in particular for pasty or liquid foodstuffs. The casing is preferably used for packaging animal food, cheese, pastry, marzipan or soups.

The following Examples are intended to illustrate the subject matter of the invention.

EXAMPLES

The Examples listed below were produced by biaxial stretching of primary tubes with a diameter of 15 mm coextruded through a multilayer die and, after heat setting, have a diameter of 45 mm. The following abbreviations are used for the various materials which are used to produce the coextruded casings according to the invention and the Comparative Examples:

| | | |
|---|---|---|
| PA | polyamide 6 or polyamide 6/66 | e.g. Durethan B 38 F (Bayer AG) |
| a-PA | partially aromatic copolyamide | e.g. Selar PA 3426 (DuPont) |
| PO | polyolefin | e.g. Moplen X30S (Montell) |
| HV | polyolefin-based coupling agent | e.g. Admer QF 551 (Mitsui Chemicals) |
| XX | ethylene/vinyl alcohol copolymer | e.g. EVAL LC F 101 BZ (Kuraray) |
| MB | PA-based coloured masterbatch | e.g. red coloured masterbatch (Wilson) |

Example 1 (B1)

| | | |
|---|---|---|
| Layer A (outside): | PA | (22 $\mu$m) |
| Layer B: | XX | (3 $\mu$m) |
| Layer C: | PA | (12 $\mu$m) |
| Layer D: | HV | (6 $\mu$m) |
| Layer E (inside): | PO | (8 $\mu$m) |

Example 2 (B2)

| | | |
|---|---|---|
| Layer A: | 75% PA, 10% a-PA, 15% MB | (22 $\mu$m) |
| Layer B: | XX | (2 $\mu$m) |
| Layer C: | PA | (14 $\mu$m) |
| Layer D: | HV | (4 $\mu$m) |
| Layer E: | PO | (7 $\mu$m) |

Comparative Example 1 (V1)

| | | |
|---|---|---|
| Layer A: | 95% PA, 5% a-PA | (22 $\mu$m) |
| Layer B: | XX | (3 $\mu$m) |
| Layer C: | PA | (12 $\mu$m) |
| Layer D: | HV | (4 $\mu$m) |
| Layer E: | PA | (12 $\mu$m) |

Comparative Example 2 (V2)

| Layer A: | PA | (24 μm) |
|---|---|---|
| Layer B: | HV | (2 μm) |
| Layer C: | PO | (15 μm) |
| Layer D: | HV | (2 μm) |
| Layer E: | PA | (12 μm) |

Comparative Example 3 (V3)

| Layer A: | PO | (8 μm) |
|---|---|---|
| Layer B: | HV | (4 μm) |
| Layer C: | PA | (22 μm) |
| Layer D: | XX | (3 μm) |
| Layer E: | PA | (8 μm) |

The layer thicknesses of the individual layers stated in the Examples relate to the finished products, i.e. the stretched tubular films.

The water vapour and oxygen permeability values and the applicational evaluations of the casings produced according to the Examples and Comparative Examples are summarised in the following Table:

|  | B1 | B2 | V1 | V2 | V3 |
|---|---|---|---|---|---|
| Water vapour permeability ($g \cdot m^2 \cdot d^{-1}$) | 1.7 | 1.8 | 4.0 | 1.5 | 1.8 |
| Oxygen permeability ($ml \cdot m^2 \cdot d^{-1} \cdot bar^{-1}$) | 4.6 | 4.3 | 4.0 | 25.0 | 4.5 |
| Weight loss of test contents on storage testing (wt. %) | 1.8 | 1.9 | 5.0 | 1.6 | 1.9 |
| Degree of creasing of casing after storage test (rating) | 1 | 1 | 5 | 2 | 2 |
| Optical appearance of contents after storage test (rating) | 1 | 1 | 1 | 4 | 1 |
| Adhesion of contents to inner side of casing | slight | slight | severe | severe | severe |

Rating:
1 = very good
2 = good
3 = satisfactory
4 = adequate
5 = inadequate

What is claimed is:

1. A multilayered, coextruded tubular biaxially stretched casing consisting essentially of:
   a) an outer layer A, that contains as its principal component at least one polyamide;
   b) a layer B, interposed between layers A and C, exhibiting oxygen barrier properties;
   c) a core layer C, that contains as its principal component at least one polyamide;
   d) a layer D, interposed between said layer C, and a layer E, that contains a modified polyolefin; and
   e) said layer E, being an inner, water vapor barrier layer, that contains as its principal component at least one member selected from the group consisting of homopolyolefin and copolyolefin wherein layer E has low adhesion to the casing's contents.

2. The casing of claim 1, wherein the principal component of said layer A is at least one member selected from the group consisting of aliphatic homopolyamide, aliphatic copolyamide, and a blend of aliphatic homopolyamide and a partially aromatic polyamide.

3. The casing of claim 1, wherein the principal component of said layer C is at least one member selected from the group consisting of aliphatic homopolyamide, aliphatic copolyamide, and a blend of aliphatic homopolyamide and a partially aromatic polyamide.

4. The casing of claim 2, wherein said partially aromatic polyamide is a product of m-xylylenediamine and adipic acid.

5. The casing of claim 2, wherein said partially aromatic polyamide is a product of hexamethylenediamine and isophthalic acid and terephthalic acid.

6. The casing of claim 3, wherein said partially aromatic polyamide is a product of m-xylylenediamine and adipic acid.

7. The casing of claim 3, wherein said partially aromatic polyamide is a product of hexamethylenediamine and isophthalic acid and terephthalic acid.

8. The casing of claim 1, wherein layer B contains a substantially hydrolyzed ethylene/vinyl acetate copolymer having an ethylene content of 25 to 53 percent by weight.

9. The casing of claim 1, wherein layer B contains a substantially hydrolyzed ethylene/vinyl acetate copolymer having an ethylene content of 29 to 38 percent by weight.

10. The casing of claim 1, where the polyolefin of said layer E is polypropylene.

11. The casing of claim 1, wherein said layer E is less than 10 μm thick.

12. The casing of claim 1, wherein said modified polyolefin of layer D is an α-olefin having 2 to 8 C atoms, that contain at least one grafted or copolymerized monomer selected from the group consisting of α,β-unsaturated dicarboxylic acid and the derivatives thereof.

13. The casing of claim 1, wherein one or more layers contain at least one pigment.

14. The casing of claim 1, having a total thickness of 25 to 80 μm.

15. The casing of claim 1, wherein said casing has a degree of stretching per unit area that is at least 4.

16. The casing of claim 1, wherein said casing is heat set.

17. The casing of claim 1, wherein said casing has a free shrinkage value in at least one direction of orientation, measured at 100° C. in water, after 15 minutes of 1 to 25%.

18. The casing of claim 1, having a final diameter of at least 10 and at most 400 mm.

19. A method of using the casing of claim 1, comprising wrapping a foodstuff therein.

* * * * *